United States Patent [19]

McDaniel et al.

[11] Patent Number: 4,803,253

[45] Date of Patent: Feb. 7, 1989

[54] ETHYLENE POLYMER PRODUCED USING A CATALYST COMPRISING A PHOSPHATE AND WITH A BIS-(CYCLOPENTADIENYL)CHROMIUM-(II) COMPOUND

[75] Inventors: Max P. McDaniel; James N. Short, both of Bartlesville, Okla.

[73] Assignee: Phillips Petroleum Company, Bartlesville, Okla.

[21] Appl. No.: 718,047

[22] Filed: Mar. 29, 1985

Related U.S. Application Data

[60] Continuation-in-part of Ser. No. 575,631, Jan. 31, 1984, abandoned, which is a division of Ser. No. 423,499, Sep. 24, 1982, Pat. No. 4,690,990, which is a division of Ser. No. 363,681, Mar. 30, 1982, Pat. No. 4,424,139.

[51] Int. Cl.$^4$ .................. C08F 110/02; C08F 4/78
[52] U.S. Cl. ...................... 526/352.2; 526/160; 526/170; 526/129; 526/130; 526/348; 526/352
[58] Field of Search ............... 526/348, 352, 160, 170, 526/352.2, 129, 130

[56] References Cited

U.S. PATENT DOCUMENTS

| | | | |
|---|---|---|---|
| 2,840,551 | 6/1958 | Field et al. .................. | 260/93.7 |
| 3,645,992 | 2/1972 | Elston ..................... | 526/348.2 X |
| 3,646,000 | 2/1972 | Horvath ................... | 526/352 X |
| 3,709,853 | 1/1973 | Karapinka ................. | 526/352 X |
| 3,806,500 | 4/1974 | Karol ...................... | 526/352 X |
| 3,879,368 | 4/1975 | Johnson ................... | 260/94.9 |
| 4,015,059 | 3/1977 | Karol ...................... | 526/348 X |
| 4,101,445 | 7/1978 | Levine et al. .............. | 526/352 X |
| 4,130,505 | 12/1978 | Nasser, Jr. et al. .......... | 526/352 X |
| 4,219,444 | 8/1980 | Hill et al. ................. | 526/160 X |
| 4,361,685 | 11/1982 | Shipley ................... | 526/352 X |
| 4,404,344 | 9/1983 | Sinn et al. ................ | 526/352 X |
| 4,410,672 | 10/1983 | Inazawa ................... | 526/352 X |

OTHER PUBLICATIONS

Brandrup, J. (ed.), "Polymer Handbook", Wiley Interscience, Inc., pp, I-1 and I-4 (1975).

*Primary Examiner*—Joseph L. Schofer
*Assistant Examiner*—F. M. Teskin
*Attorney, Agent, or Firm*—Williams, Phillips & Umphlett

[57] ABSTRACT

In accordance with one embodiment of this invention, a bis-(cyclopentadienyl)chromium(II) compound is introduced onto an activated phosphate-containing support and utilized in conjunction with an organometal cocatalyst, such as an alkylaluminum. In accordance with another embodiment of this invention, a phosphate-containing zerogel is formed by removing water from an aluminum phosphate-containing hydrogel by means of azeotropic distillation or washing with a volatile, water mis-cible organic compound, activated and thereafter a bis-(cyclopentadienyl)chromium(II) compound is incorporated therewith. In other embodiments of this invention, a phosphate-containing support is formed by forming aluminum phosphate from an aluminum alkoxide or from a melt, or by phosphating silica or alumina, or by forming an aluminum phosphate/silica combination. A support thus formed is activated and a bis-(cyclopentadienyl)chromium(II) compound added. Alternatively in all embodiments, the chromium and phosphate components can be added separately. The resulting catalysts are capable of giving narrow molecular weight distribution polymer because of the inherent high molecular weight of the polymer produced, and the unusual sensitivity to hydrogen, a broad spectrum of polymers can be produced so far as molecular weight is concerned. The catalyst is ideally suited for forming olefin polymers such as ethylene and ethylene copolymers in a slurry system.

14 Claims, 3 Drawing Sheets

ETHYLENE POLYMER PRODUCED USING A CATALYST COMPRISING A PHOSPHATE AND WITH A BIS-(CYCLOPENTADIENYL)CHROMIUM(II) COMPOUND

CROSS REFERENCE TO RELATED APPLICATIONS

This is a continuation-in-part of copending application Ser. No. 575,631 filed Jan. 31, 1984, now abandoned, which in turn was a divisional of copending application Ser. No. 423,499, filed Sept. 24, 1982, now U.S. Pat. No. 4,690,990, which in turn was a divisional of application Ser. No. 363,681, filed 3/30/82 now U.S. Pat. No. 4,424,139.

BACKGROUND OF THE INVENTION

This invention relates to phosphate-containing chromium catalyst systems for olefin polymerization.

Supported chromium catalysts can be used to prepare olefin polymers in a hydrocarbon solution to give a product having excellent characteristics from many standpoints. Silica supported chromium catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle-form process. It is known to extend the range of melt flow capability of a given catalyst through the use of hydrogen. However, it has not heretofore been commercially feasible to produce a complete spectrum of polymers, so far as melt flow is concerned, in a slurry system with a single chromium catalyst system.

Also it is frequently desired to have a polymer with narrower molecular weight distribution than is normally obtained in the slurry or particle-form process.

There would be certain advantages to utilizing chromium which does not require activation in supported chromium olefin polymerization catalyst systems in that there are some problems associated with calcining a base already containing chromium. However, the only supported chromium olefin polymerization systems to achieve commercial success have been those in which chromium is supported on silica and the resulting combination is calcined. This is because of the very low activity associated with other supported systems. Thus olefin polymerization using the chromium catalyst system is still carried out utilizing calcined chromium on a silica-containing base in a manner similar to that used decades ago when the chromium catalyzed polymerization of olefin polymers first became commercial.

SUMMARY OF THE INVENTION

It is an object of this invention to provide a catalyst capable of giving narrow molecular weight distribution;

It is a further object of this invention to provide a catalyst suitable for use in slurry polymerization systems;

It is yet a further object of this invention to provide a catalyst capable of giving polymer suitable for injection molding and other applications requiring narrow molecular weight distribution.

It is yet a further object of this invention to provide a single catalyst system capable of giving a broad spectrum of polymers so far as melt flow is concerned;

It is a further object of this invention to provide an improved phosphate-containing $\pi$-bonded chromium catalyst system for olefin polymerization;

It is a further object of this invention to provide a novel ultrahigh molecular weight polymer having a high degree of methyl branching;

It is yet a further object of this invention to produce a novel narrow molecular weight distribution polymer having a high degree of methyl branching;

It is yet a further object of this invention to provide a catalyst system having unusual sensitivity to molecular weight control agents such as hydrogen; and It is still yet a further object of this invention to avoid the problems associated with calcining chromium containing supports.

It accordance with one embodiment of this invention, a bis(cyclopentadienyl) chromium(II) compound and an activated phosphatecontaining composition are utilized in conjunction with an organometal cocatalyst. In accordance with another embodiment of this invention, the phosphate-containing xerogel is formed by removing water from an aluminum phosphate hydrogel by means of azeotropic distillation or washing with a volatile water miscible organic compound, activated and thereafter is combined with a bis-(cyclopentadienyl)-chromium(II) compound. In accordance with other embodiments of this invention, a phosphate-containing support for a bis-(cyclopentadienyl)chromium(II) compound is formed by: forming aluminum orthophosphate from an aluminum alkoxide or from a melt, phosphating silica or alumina, or by forming an AlPO$_4$/silica composition.

BRIEF DESCRIPTION OF THE DRAWINGS

In the drawings forming a part hereof.

DESCRIPTION OF THE PREFERRED EMBODIMENTS

The base or support can be formed in a number of ways. Four methods of preparing the support are set out hereinbelow under the headings Method A, Method B, Method C and Method D.

Method A. The support of Method A is at least predominantly amorphous aluminum orthophosphate. In accordance with Method A, the phosphate-containing support can be formed using three separate techniques. First, conventional techniques as disclosed in Hill et al, U.S. Pat. No. 4,219,444, the disclosure of which is hereby incorporated by reference can be used. In this technique an aluminum salt is combined with a source of phosphate ions in an aqueous medium and neutralized with a base to give a hydrogel. Alternatively, a polar organic solvent can be used. The second technique for forming the base of Method A is to combine a hydrolyzable organoaluminum compound such as an aluminum alkoxide as disclosed in Pine, U.S. Pat. No. 3,904,550, the disclosure of which is hereby incorporated by reference, with orthophosphoric acid to give a xerogel directly.

In accordance with the third technique of Method A, an aluminum phosphate gel is formed from a concentrated mass of reactants comprising aluminum ions from an aluminum salt and a source of orthophosphate ions. This is done by using an aluminum salt which will melt, preferably one which will melt at or below the boiling point of water or by forming a syrup of a water soluble aluminum salt and a very small amount of water.

Generally, hydrated aluminum salts such as hydrated aluminum nitrate are most susceptible to being melted and thus are preferred as the source of aluminum ions for the melt method. Aluminum bromide and hydrated aluminum bromate can also be used as can, broadly, any aluminum salt which will melt. If desired up to 40 weight percent, more generally up to 20 weight percent additional water can be present based on the weight of the aluminum salt or there can be no water except the water, if any, from the water of hydration and the water, if any, from the base used in the subsequent neutralization, i.e., no extraneous water is added. By additional water is meant water actually added as water and does not count the water, if any, from the water of hydration of the ingredients and/or the water from the base, if any. There may be some advantage to adding 1 to 15 weight percent water based on the weight of the aluminum salt, however. The percentages of water are based on the actual weight of the aluminum salt including any water of hydration.

Alternatively, an aluminum salt which will not necessarily melt but which will dissolve enough to form a syrup in 40 weight percent, or less, water based on the weight of the aluminum salt can be used. Generally, 5 to 20 weight percent water is used based on the weight of the aluminum salt when a syrup is formed. Aluminum sulfate, for instance is ideally suited for use in this embodiment of the invention.

The source of the phosphate ions can be any source of orthophosphate ions and is generally orthophosphoric acid or orthophosphates, such as monobasic ammonium phosphate or dibasic ammonium phosphate or mixtures thereof.

The temperature, if a melt is used, can be any temperature at or above which the aluminum salt chosen will melt. The reaction can be carried out in any atmosphere including air or can be carried out under an inert atmosphere for instance. Generally, temperatures of 65°–200° C., preferably 65°–100° C. are used. Although, since the preferred aluminum salt is $Al(NO_3)_3 \cdot 9H_2O$ which melts at 73° C., the most preferred temperature based on the use of this aluminum salt is about 80° C.±5° C. If a very concentrated syrup of a water soluble aluminum salt and water are used, any temperature up to the boiling point of the water under the conditions employed can be used, preferably 20°–100° C.

One of the advantages of this technique is that, since very little water, it any, is present during the formation of the aluminum phosphate, it is not necessary to utilize azeotropic distillation or washing with a normally liquid water miscible organic solvent to remove the water gently. The most important advantage, however, is that the concentrated mass gives a gel with greater physical strength. If very much water is present, the use of the water miscible organic solvent is preferred and it can be used in all cases.

Low pore volume hydrogels usually give the highest porosity xerogels after drying because they have superior internal strength to withstand the compression of surface tension. Thus, if the hydrogel occupies 6 cc per gram of aluminum phosphate or less, generally 3 to 6 cc per gram, it will give a xerogel having improved porosity for a catalyst base than will a hydrogel conventionally prepared from a dilute aqueous solution which will occupy about 11 cc per gram or more. By 6 cc per gram, for instance is meant that each gram of any aluminum phosphate occupied 6 cc in the hydrogel stage. Thus, another way to define the phosphate of the third technique is that the aluminum salt melt/phosphate mass or aluminum syrup/phosphate mass is sufficiently concentrated so as to give a hydrogel which occupies 3 to 6 cc per gram. The theoretical minimum if no extraneous water is added is about 3 cc per gram with hydrated aluminum nitrate as the aluminum salt source.

A small amount of a boron compound such as $B(OH)_3$ can be introduced into the melt to be cogelled with the aluminum phophate. Other suitable boron compounds include borates such as ammonium borate. By cogelled as it relates to the boron compound, it is meant that the aluminum phosphate is formed into a true hydrogel in the presence of the boron compound. It is not known to what extent the boron compound becomes incorporated into the hydrogel structure. The amount of boron compound present when the aluminum phosphate is gelled can vary widely but it is generally used in an amount so as to give about 1 to 30 mole percent boron based on the moles of phosphorus.

The neutralization in the first and third techniques of Method A can be carried out either by combining the acid phase (aluminum salt/phosphate source mixture) with the neutralizing agent or vice versa. One suitable practice is to drip the acid phase into the neutralizing agent. This results in the production of small spheres or balls of the orthophosphate, particularly with the third technique where the melt of aluminum salt and source of phosphate ions is dripped or sprayed or otherwise slowly added to a large excess of ammonium hydroxide. The spheres as subsequently collected, washed, dried and calcined. It is desirable that the gellation in the first and third methods not occur at a pH of about 4. The pH can be at least 6 during the gel formation. Generally, the pH when the gellation occurs will be 5 to 10, more generally 6 to 10. This is effected by slowly combining with stirring about 72 percent of the neutralizing agent required for complete neutralization and then quickly combining the rest so as to go quickly through the 4–5 pH range. Alternatively, about 60 to 70 percent of the neutralizing agent required for complete neutralization can be combined and the resulting composition allowed to age until gellation occurs. While any base can be used, concentrated ammonium hydroxide, ammonia gas or ammonia dissolved in an alcohol or other non-aqueous solvent are preferred basic materials. Also ammonium carbonate can be used as the neutralizing agent as can ethylene oxide or propylene oxide.

The aluminum and phosphorus components are selected so as to give an atom ratio of phorous to aluminum within the range of 0.2:1 to 1:1, preferably 0.6:1 to 0.9:1. While these compositions can be visualized for convenience as a mixture of alumina and aluminum phosphate of varying proportions, they are in fact not a mixture.

Method B. The support of Method B is a phosphated silica-containing material generally composed of 80 to 100 weight percent silica, the remainder, if any, being selected from alumina, boria, magnesia, thoria, titania, zirconia, or mixtures thereof. For instance, the silica-containing material can consist essentially of silica and no more than 0.2 weight percent of alumina or other metal oxide. This is a less preferred embodiment because the presence of the silica lowers the activity, Other ingredients which do not adversely affect the catalyst or which are present to produce some unrelated result can also be present. The silica can be a large pore material prepared as described in U.S. Pat. Nos. 3,887,494 which issued June 3, 1975 to Dietz covering the preparation of silica-titania cogels or U.S. Pat. No. 3,900,457 which issued Aug. 19, 1975 to Witt covering the preparation of a synthetic silica, the disclosures of which are hereby incorporated by reference. These types of silicas are known in the art to inherently give higher melt flow polymer. However, one of the advantages of the use of the support of Method B is that the silica base which is to be phosphated does not have to be a large pore silica. Thus, less expensive silicas made by simple tray drying, oven drying or spray drying can be used. These silicas are easier and less expensive to produce and are inherently more durable.

The treatment to produce the phosphated silica support is preferably carried out simply by forming a slurry of the silica xerogel and a source of phosphate ions, such as orthophosphoric acid by either adding the acid to the support or the support to the acid. Alternatively, an orthophosphate can be utilized. The preferred phosphate is a monoammonium phosphate although diammonium phosphate or metal phosphates or any phosphorus compound convertible to a phosphate can be utilized as the phosphating agent. Any reasonable temperature and atmosphere can be utilized for the incorporation of the phosphorus compound with the silica with room temperature in air being entirely satisfactory. Alternatively, a phosphorus compound such as $POCl_3$ (phosphoryl chloride or $PCl_3$, phosphorus trichloride) can be vaporized and the vapor contacted with the silica. These materials will react with surface OH groups and give off HCl. This vapor treatment can be carried out at the vaporization temperature of the phosphorus compound up to about 400° C.

The term "phosphated" is meant to describe the silica treated with a phosphorus compound as described herein and not necessarily to mean that phosphate groups are attached to the silica.

Alternatively, the phosphating agent can be added to the silica at the hydrogel stage of the silica.

The phosphorus component is added in an amount to give 0.001 to 0.2, preferably 0.01 to 0.1 gram atoms of phosphorus per mole of silica. Most preferably about 1 to 5 mole percent is used which would be about 1 to 5 atoms of phosphorus per atom of chromium particularly when the preferred 1 weight percent chromium based on the weight of the phosphated support is used. Generally, the ratio of atoms of phosphorus per atom of chromium will be in the range of 0.1 to 20, peferably 1 to 10.

Based on surface area, the phosphorus compound is preferably present in an amount sufficient to give about 0.005 to 1, preferably about 0.01 to 0.5 mg $P/m^2$ of silica surface as measured by BET nitrogen sorption.

Methoc C. The support of Method C is a silica/phosphate combination and is also less preferred because the presence of the silica lowers the activity. The silica/phosphate combination of Method C can be made in four separate techniques. First, the two can be coprecipitated as is known in the art, for instance as shown in Kirby, U.S. Pat. No. 3,342,750 Sept. 19, 1967), the disclosure of which is hereby incorporated by reference. In accordance with this technique, a silicate is combined with a source of aluminum ions and a source of phosphate ions and neutralized to form a hydrogel cogel. The silicate is preferably a tetrahydrocarbyl orthosilicate, such as ethyl silicate, although sodium silicate can also be used. The aluminum component is preferably aluminum nitrate although aluminum chloride or other aluminum salts can be used. The source of phosphate ions is preferably orthophosphoric acid although monobasic dihydrogen ammonium phosphate, and dibasic hydrogen ammonium phosphate, for instance, can also be used. This reaction is generally carried out in an aqueous medium although a polar organic solvent can be used. A small amount of a boron compound such as boric acid can be introduced into the reaction mixture to be cogelled with the aluminum phosphate and silica. Other suitable boron compounds include borates such as ammonium borate. By cogelled as it relates to the boron compound, it is meant that the silica/aluminum phosphate is formed into a hydrogel in the presence of the boron compound. It is not known to what extent the boron compound becomes incorporated into the hydrogel structure. The amount of boron compound present when the silica/aluminum orthophosphate cogel is formed can vary widely but it is generally used in an amount so as to give 0.5 to 15 mole percent boron based on the moles of phosphorus.

While any basic material can be used, concentrated ammonium hydroxide, ammonia gas, or ammonia dissolved in alcohol or other non-aqueous solvent are preferred basic materials. Ammonium carbonate alone or in combination can be used as the neutralizing agent, as can ethylene oxide or propylene oxide.

The neutralization can be carried out either by adding the acid phase to the neutralizing agent or vice versa. One suitable practice is to drip or spray or otherwise slowly add the acid phase into the base phase. It is sometimes preferred that the gellation occur at a pH of at least 5, preferably at least 6. Generally the pH when the gellation occurs will be in the range of 5 to 10, preferably 6 to 10.

Since gellation will occur spontaneously at a pH of about 4, which is achieved by combining about 72 percent of the base, or other neutralizing agent, either about 60 to 70 percent of the neutralizing agent is combined slowly and then the composition is allowed to age until gellation occurs, or else about 72 percent of the base is slowly combined with stirring and then the rest is combined quickly so as to go through the 4-5 pH range quickly as described above.

It may be desirable in some instances to coprecipitate other materials such as titania with the silica/aluminum orthophosphate cogel or have other materials present during the gellation.

In accordance with the second technique of Method C, the silica/aluminum orthophosphate cogel is made by impregnating a silica hydrogel or xerogel with aluminum phosphate. This is carried out by combining the source of aluminum ions and orthophosphate ions with a slurry of silica hydrogel or xerogel and then evaporating the solvent whereupon the aluminum orthophosphate forms. It is believed the aluminum orthophosphate forms to a substantial extent within the pores of the silica. Alternatively, the source of aluminum and phosphate ions can be adsorbed onto the dry silica. This is largely a physical impregnation and entrapment of the phosphorus component in the pores of the silica. When a silica xerogel is used, instead of evaporating to dryness, the evaporation can stop when the liquid in excess of one pore volume is gone but some liquid remains in the pores and a gel formed by adding a neutralizing agent, or an amount of liquid less than one pore volume can be added initially and the gel formed by adding a neutralizing agent. The scope of the silica can be the same as in Method B.

As to the scope of the aluminum and phosphorus components, the base when used, and the solvent, is the same as that set out hereinabove with regard to the first technique of Method C. One difference in scope between these two techniques is that in this technique a boron compound such as ammonium borate or boric acid can be substituted for the aluminum salt so as to form what is believed to be boron phosphate onto the silica on evaporating the solvent.

In accordance with the third technique of forming the silica/phosphate base in accordance with Method C, aluminum orthophosphate is gelled in the presence of a silica-alumina hydrogel or xerogel. This results in forming the silica-alumina as a dispersed phase in an aluminum orthophosphate matrix as opposed to having the aluminum orthophosphate impregnated into the pores of the silica. In accordance with this technique, a source of aluminum and phosphate ions is combined with a silica-alumina hydrogel or xerogel and the aluminum orthophosphate formed by combining with a neutralizing agent. The scope of the ingredients is the same as in the first technique of Method C hereinabove except monobasic ammonium phosphate is the preferred source of phosphate ions. As with the first technique of Method C, a boron compound can be present during the gellation of the aluminum orthophosphate. Also, the same pH considerations as in the first technique of Method C apply.

In accordance with the fourth technique of Method C for making the phosphate composition, a silica-alumina xerogel and an aluminum orthophosphate xerogel are simply physically mixed. The scope of the ingredients for making the separate silica-alumina and aluminum orthophosphate are the same as those used in the first technique of Method C for making the cogel. More broadly, any known method of making silica-alumina suitable for use as a base in olefin polymerization catalysts and any known methods of making aluminum orthophosphate having relatively high surface area can be used for producing the silica and aluminum orthophosphate, respectively. In addition, the aluminum orthophosphate can be made by forming a melt of an easily melted aluminum salt such as hydrated aluminum nitrate, adding a source of phosphate ions and neutralizing as described in Method A, technique three. The resulting silica-alumina and aluminum orthophosphate xerogels can simply be ground together or blended in a conventional dry blender or mixed in a slurry with a nonreactive diluent such as a hydrocarbon. In making the phosphate, the same pH considerations apply as in the first technique of Method C.

One way of achieving this mixture is to charge the silica-alumina and aluminum orthophosphate in powder form to the activator with the fluidization normally employed during the activation serving to effect the mixing. Alternatively, the silica-alumina and aluminum orthophosphate can be separately activated, the divalent chromium added and thereafter the two combined.

The aluminum and phosphorus components in Method C are selected so as to give an atom ratio of phosphorus to aluminum within the range of 0.2:1 to 1:1, preferably 0.6:1 to 0.9:1. Further with respect to the relative proportions, in all techniques except technique two, the silica and phosphate will generally be used in molar ratios of 10:1 to 1:20 moles of slica per mole of phosphate (or gram atoms of phosphorus), preferably 2:1 to 1:2 moles per mole or gram atom. In embodiment two, the phosphate will generally be used in an amount within the range of 1 to 50, preferably 5 to 25 mole percent based on the moles of silica.

Method D. In accordance with Method D for preparing the phosphate-containing base, alumina is phosphated in a manner analogous to the phosphating of silica in Method B. As with the silica, the alumina can be phosphated either by combining the phosphating agent with the hydrogel or combining the phosphating agent with the xerogel. The same scope of phosphating agents applicable to phosphating the silica are applicable to phosphating the alumina. In addition to phosphating pure alumina, it is also within the scope of this method of producing the phosphate-containing base to utilize an aluminum phosphate described in Method A having a low (less than about 0.6, generally less than 0.4) phosphorus to aluminum ratio and treating it with the phosphating agent to impart additional phosphate to the surface. The alumina can contain minor amounts of other ingredients which do not affect the quality of the final catalyst, but is generally essentially pure alumina or low phosphorus aluminum phosphate.

If an aluminum hydrogel is phosphated, the phosphoric acid is preferably incorporated in the organic water miscible liquid used to wash the hydrogel. More specifically, the hydrogel may be washed with water, then with an organic liquid such as isoamyl alcohol containing phosphoric acid, then filtered and the solvent allowed to evaporate.

Whether the starting material is pure alumina or a low phosphorus aluminum orthophosphate, Method D takes advantage of the fact that some properties, such as surface area, are favored by high aluminum content whereas others, such as melt index potential, are favored by high phosphate content. By imparting a phosphate layer on the surface of pure alumina or low phosphorus aluminum phosphate, both trends can be taken advantage of.

The phosphating agent is preferably used in an amount to react with the alumina surface and give a P/Al ratio of this reaction product on the surface of 0.2:1 to 1:1, preferably 0.6:1 to 0.9:1. In practice, however, it is possible to use as much phosphating agent as desired with the excess simply being washed off after the phosphating treatment is complete. Overall the P to Al ratio will be less than 0.3:1, generally 0.1:1 to 0.3:1, preferably 0.1:1 to 0.2:1. Ratios as low as 0.05:1 overall have been found to be satisfactory. The phosphating treatment is generally carried out at a temperature of 15° C. to 500° C., preferably room temperature to the boiling point of the solvent if a phosphate solution is used or 500° C. if a vapor is used and a time of 1 minute to 2 hours, preferably 2 minutes to 30 minutes. The phosphated alumina results in a catalyst which surprisingly gives a bimodal molecular weight distribution in ethylene polymerization.

In any of the four methods set out hereinabove, wherein a hydrogel is formed, it is greatly preferred that the water be removed to convert the hydrogel to a xerogel by means of azeotropic distillation or washing with a water miscible liquid. Any such water miscible liquid effective in aiding in removing water can be utilized. Generally, such liquids are relatively volatile, oxygen-containing organic compounds having relatively low surface tension. Exemplary classes of such compounds are alcohols, ketones, and esters. Particularly suitable are alcohols, such as isoamyl alcohol and esters, such as ethyl acetate.

As to Method A, it is readily apparent that the hydrogel resulting from technique 1 utilizing an aqueous solution of the aluminum component, the phosphorus component, and an aqueous solution of the base results in free water in the hydrogel. In technique 2 of Method A, there could be some water from the water in the phosphoric acid although there is no water from a base since a base is not required and hence this is essentially an anhydrous preparation. In technique 3 of Method A, there is essentially no free water in the resulting gel from the acid phase ingredients so that the resulting gel inherently has the good characteristics associated with the hydrogels made in non-aqueous systems. However, there may be some water carried over from water of hydration of the aluminum component and/or from the base and also it may be desirable in some instances in technique 3 of Method A to wash the resulting gel with water in case azeotropic distillation to remove the water is desirable.

In Method C, techniques 1 and 3, carried out utilizing aqueous solutions of the ingredients involve the formulation of hydrogel having excess free water and thus create the situations where azeotropic distillation or washing with a water miscible solvent is highly desirable.

Regardless of which of the four methods (A, B, C, or D) described hereinabove are used, the resulting support is calcined or activated and thereafter combined with the chromium component. Throughout this description the phosphate component has been referred to as the support or base. The phosphate component and the chromium component can be combined by adding each as a separate stream to the reactor or the chromium component can be impregnated onto the phosphate component prior to being added to the reactor. In this case, the chromium component is added in an anhydrous fashion. Thus briefly, the technique for forming the catalyst involves forming a phosphate-containing support, activating the support by heating in a reducing, inert or oxidizing ambient, and adding divalent chromium anhydrously to form a catalyst (or adding each separately to the reactor).

Since neither the chromium component or the phosphate component is an effective catalyst by itself, the phosphate can be viewed as a support even when the two are added to the reactor as separate streams. Because of the possibility of contamination of the impregnated and dried phosphate with water and/or air, which lowers activity, it is actually preferred to introduce the support and the chromium component as separate streams into the reaction zone.

In some instances, the catalyst is used with a cocatalyst, such as an organoaluminum compound to increase activity. Other ingredients which do not adversely affect the catalyst can be used with the final catalyst such as other cocatalysts or antistatic agents in the polymerization zone, for instance.

The term "xerogel" is used to refer to the gel resulting from the removal of free water from the hydrogel.

Figure 1:
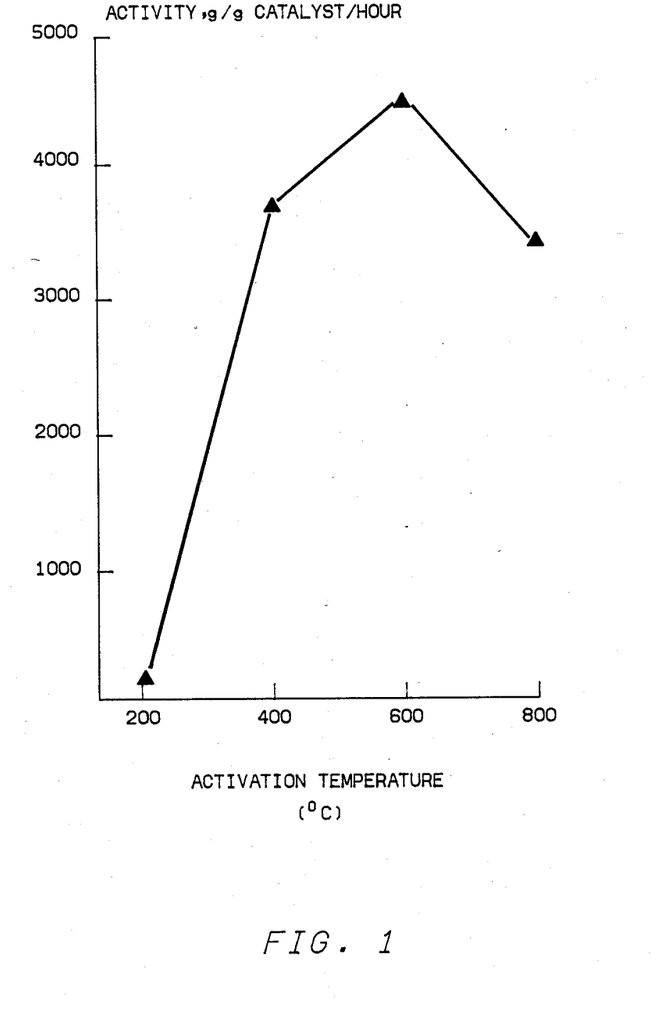
FIG. 1 shows the relationship between activation temperature for the support and productivity.

The activation of the xerogel can be carried out at temperatures known in the art although the phosphate-containing base of this invention can be activated at slightly lower temperatures, for instance temperatures of 150°-800° C., preferably 400°-750° C., compared with the 450°-1000° C. temperature generally employed for silica bases. The ideal activation temperature can be seen from FIG. 1. With technique 4 of Method C, if the silica-alumina and aluminum phosphate are to be combined with activation, each can be activated at the temperature optimum for that component, i.e., 450°-1000° C. for the silica-alumina and 150°-800° C. for the phosphate. Thus broadly temperatures of 150°-1000° C. can be used. Suitable activation times are from 1 minute to 48 hours, preferably 0.5 to 10 hours.

When the activating ambient is an oxidizing ambient, it can be any oxidizing ambient but for convenience and economy, an oxygen-containing ambient such as air is preferred. Preferred reducing ambients are pure CO and CO/N$_2$ mixtures. Preferred inert ambients are N$_2$ and vacuum. Air is preferred simply because of cost.

The term "bis-(cyclopentadienyl)chromium(II) compound" includes not only bis-(cyclopentadienyl)chromium(II) but substituted derivatives thereof in which the cyclopentadienyl rings contain one or more substituents which do not affect the ability of the adsorbed substituted bis-(cyclopentadienyl)chromium(II) compound to function as an ethylene polymerization catalyst. The specific bis-(cyclopentadienyl)chromium(II) compound, bis-(cyclopentadienyl)chromium(II) sometimes called chromocene has the follow-ing postulated structure:

Also suitable is bis-(fluoroenyl)chromium(II)

Cr, and bis-(indenyl)chromium(II),

Cr as well as bis(cyclopentadienyl)chromium(II) compounds having substituted ligands of the formula Cr where one or both R groups can be thought of as a divalent cation (chromium) coordinated by two negatively charged cyclopentadienyl ligands.

The bis-(cyclopentadienyl)chromium(II) compounds are solids solu-ble in many organic solvents. Preferred solvents are non-polar liquids at ambient temperatures. Types of suitable solvents include alkanes, cycloalkanes, alkenes, and aromatic hydrocarbons. Exemplary solvents include pentane, n-hexane, decane, cyclohexane, methylcyclohexane, 1-butene, benzene, xylenes, and mixtures of one or more of the pure compounds. Preferably, a sufficient quantity of a solution of the chromium component is used to completely wet the support and fill the porous structure to insure even distribution of the metal compound on the support. Generally, the solutions contain from about 0.002 to about 25 weight percent of the organochromium compound whether used to impregnate the support or added separately.

A sufficient volume of the solution of the organochromium compound is taken so as to provide from 0.01 to 10, preferably 0.1 to 5, more preferably about 1-3 weight percent chromium based on the weight of the activated support. The contact between the support and organochromium solution is effected in a conventional way such as by slurrying and at any convenient temperature. Generally, ambient temperature is used, although temperatures ranging from about the freezing point of the solvent to as high as about 300° F. can be employed during the contacting period. Contact times from a few seconds to several hours are adequate. The same amounts are used when the chromium component is added as a separate stream. This is slightly more chromium than is typically used in the prior art.

The incorporation of the chromium component onto the activated base is preferably carried out in an inert atmosphere, such as nitrogen or under a vacuum, and the resulting catalyst is maintained in an inert atmosphere or under vacuum until it is used.

The cocatalyst, when used, is an organometal compound, preferably a trihydrocarbylborane, more preferably trialkylborane, the alkyl groups preferably having 1 to 12, more preferably 2 to 5, carbon atoms per group. Triethylborane, tri-n-propylborane, and tri-n-butylborane are suitable for instance. Less preferred but also suitable are aluminum compounds of the formula $AlR'_nX_3-n$ where X is a hydride or halide, R' is a 1 to 12 carbon atom hydrocarbyl radical and n is an integer of 1 to 3. It is believed the cocatalyst simply acts as a scavenger for catalyst poisons. The term "metal" in organometal is intended to include boron.

The cocatalyst when used is utilized in an amount so as to give an atom ratio of metal to chromium within the range of 0.5:1 to 10:1, preferably 2:1 to 5:1. Based on the solvent if any in the polymerization zone, the amount of metal compound cocatalyst is generally within the range of 0.5 to 20, preferably 2 to 10 parts by weight per million parts by weight of the solvent, these amounts being based on the total reactor contents in instances where no solvent is utilized. The cocatalyst can either be premixed with the catalyst or added as a separate stream to the polymerization zone, the latter being prefereed.

The support of this invention can be further treated in the same manner as conventional silica catalysts are sometimes given special treatments, such as being fluorided or being reduced and reoxidized as disclosed in McDaniel et al, U.S. Pat. No. 4,151,122 (Apr. 24, 1979), the disclosure of which is hereby incorporated by reference. Fluoriding the support tends to produce a catalyst which gives higher molecular weight polymer. The support can also have chromium on it prior to combination with the divalent chromium. Generally the chromium in such cases will be hexavalent chromium as a result of the chromium being present during a calcining step but zerovalent chromium could be introduced onto the support and/or added as a separate stream to the reactor in addition to the divalent chromium.

The catalysts of this invention can be used to polymerize at least one mono-1-olefin containing 2 to 8 carbon atoms per molecule. Such catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalyst. One convenient method is to suspend the catalyst in an organic medium and to agitate the mixture to maintain the catalyst in suspension throughout the polymerization process.

The catalyst of this invention is particularly suitable for use in slurry polymerization systems to produce a complete spectrum of polymers so far as melt flow is concerned, utilizing a single catalyst. Everything from ultra high molecular weight resins, which may have a melt index of as little as 0 (weight average molecular weight of as much as four million, more generally three to three and one-half million), to paper coating and injection molding grade resins which may require a melt index of 20 or greater can be produced from a single catalyst system simply by the use of a molecular weight control agent, such as hydrogen. While hydrogen is known as a molecular weight control agent, the phosphate-containing supported catalysts of this invention displays an unusual sensitivity to hydrogen so that by controlling the amount of hydrogen utilized, polymers having a very high molecular weight as indicated by low melt flow, through polymers having a very low molecular weight as indicated by high melt flow can be obtained.

Surprisingly, changes in reactor temperature do not have the unusual effect of varying melt flow nor do changes in activation temperature have the usual effect of varying melt flow (of course activity is affected by changes in activation temperature). Thus, polymers having a broad spectrum of molecular weight can be produced using a single catalyst utilizing whatever activation temperature and reactor temperature are needed for good activity.

With slurry polymerization of ethylene and predominantly ethylene copolymer systems, the feasible temperature range is generally about 200°-230° F. (93°-110°

C.) and the commercial systems are generally run as close to the maximum as possible, i.e., 225° F.±5° F. (107° C.±3° C.) in order to get the highest possible melt index. The catalyst of this invention easily allows running at the low end of the possible temperature range, i.e., 205° F.±5° F. (96° C.±3° C.) in systems normally employing 225° F. (107° C.). Even temperatures below 205° F. (96° C.) can be used including temperatures of 190° F. to 205° F. (88° C. to 96° C.) and even below 190° F. (88° C.) without reactor fouling. The lower temperature gives a relatively higher monomer partial pressure, thus giving higher activity.

Productivities in the range of 5,000 to 10,000 gm/gm catalyst/hour are obtained with the catalyst systems of this invention.

Figure 2:
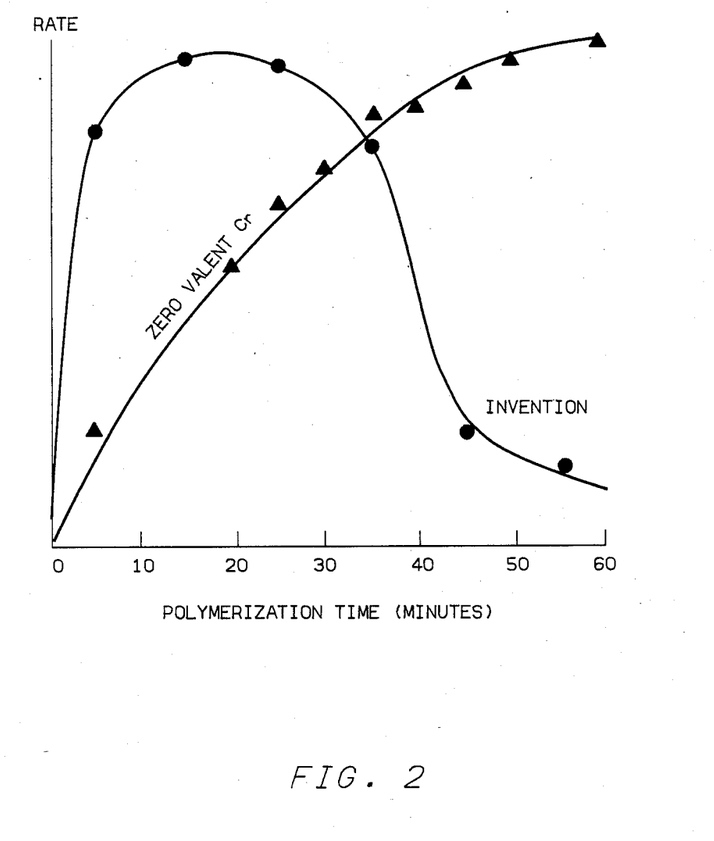
FIG. 2 compares the polymerization rate as a function of time for an invention catalyst and a zerovalent chromium catalyst.

Catalysts of this invention have the further advantage of not having any measurable induction time between initial contact with the monomer and the initiation of polymerization. As can be seen from FIG. 2 there is a fundamental difference between zerovalent chromium and the bis-(cyclopentadienyl)chromium(II) compounds of this system, each on a phosphate base in that the catalysts of the invention very quickly reach a high productivity level. Thus, while both the zerovalent chromium systems and the divalent chromium systems of this invention differ from the chromium oxide on silica in not having an induction period, the catalysts of the invention offer the further advantage of very quickly reaching a high rate of polymer production and hence are ideally suited for use in a polymerization process employing a short residence time. For instance an average residence time of 5 to 40 minutes or even 10 to 30 can be used.

When hydrogen is used in the prior art, it is generally used at partial pressures up to 120 psia (0.8 MPa), preferably within the range of 20 to 70 psia (0.01 to 0.48 MPa). These same amounts of hydrogen can also be used in this invention, although because of the high sensitivity to hydrogen, it may be preferred in the present invention to use 5 to 20 psia.

The tendency of the catalysts of this invention to produce higher melt flow polymers when hydrogen is utilized corresponds to the tendency of other catalyst systems to produce higher melt flow polymers when hydrogen is utilized, the difference being that the catalyst of this invention is unusually sensitive to the effects of hydrogen in lowering molecular weight and in the absence of hydrogen unusually high molecular weight polymer is produced thus giving an extraordinarily broad spectrum of polymers, so far as melt flow is concerned, from a single catalyst.

If the object is to produce a copolymer, 0.5 to 20 mole percent comonomer or more can be used, although enough to give 0.2 to 3 mole percent incorporation is preferred. As used herein, the term "at least predominantly ethylene" means an essentially pure ethylene monomer feed as a feed containing ethylene as the principal monomer with 0.5 to 20 mole percent comonomer.

In this regard, it must be kept in mind that HLMI/MI ratios (shear response) are meaningful only if compared on a comparable melt index basis. The references herein to melt index (MI) refer to ASTM D 1238-65T, Condition E, and to high load melt index (HLMI) refer to ASTM D 1238-65T, Condition F, the difference being 21,600 gram weight in the high load test and 2,160 gram weight in the regular melt index test, the temperature being 190° C. in each instance when the tests are utilized for predominantly ethylene polymers and copolymers.

Whether determined by shear response or the newer RDI (Rheometric Dynamic Spectrophotometer index) test, the molecular weight distribution as expressed by $M_w/M_n$ wherein $M_w$ is the weight average molecular weight and $M_n$ is the number average molecular weight, is less than anything previously attainable in the prior art with a chromium catalyst.

Figure 3:
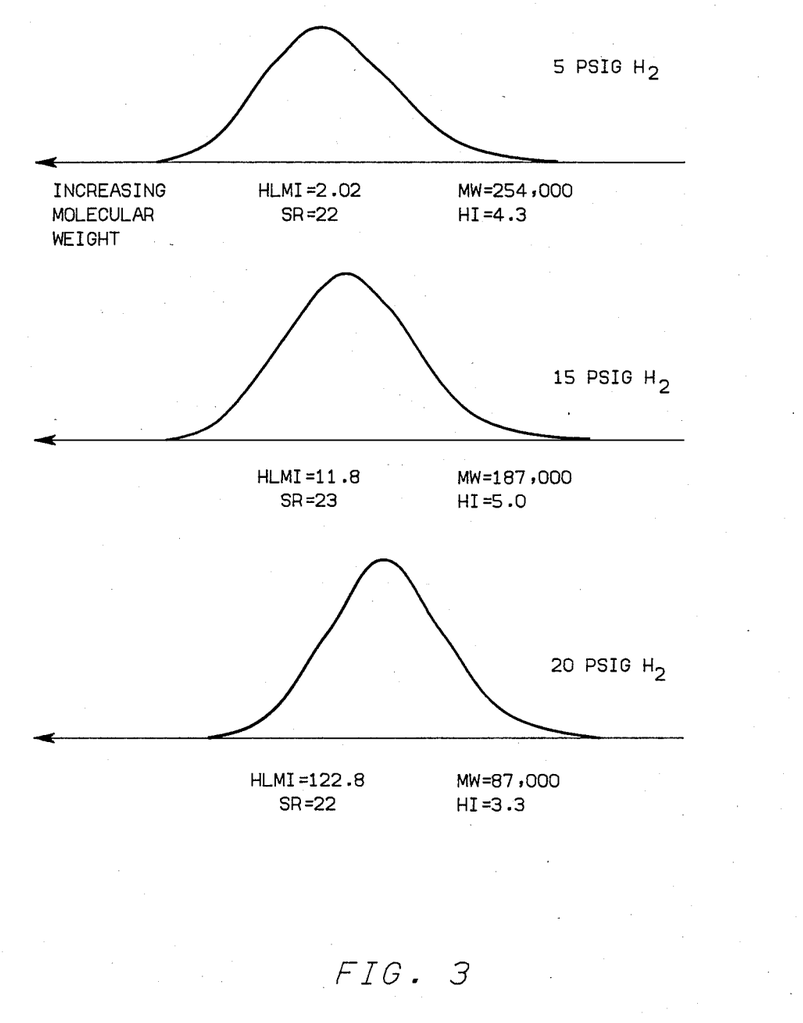
FIG. 3 shows the effect of hydrogen on molecular weight distribution.

Further, as can be seen from the size exclusion chromatography (SEC) curves of FIG. 3, increasing hydrogen pressure not only increases melt flow (reduces molecular weight) but also shifts the distribution curve so that the distribution stays narrow. Actually it gets even more narrow since there is an ultra-high molecular weight fraction in the sample represented by the upper curve which does not go into solution and hence is not shown.

Another instance in which the catalysts of this invention give an effect which is opposite to that obtained with chromium catalysts of the prior art is that the resulting polymers exhibit little or no vinyl unsaturation.

In the following Examples, productivity is the grams of polymer produced per gram of catalyst for the time of the run and activity is the grams of polymer produced per gram of catalyst per hour. Yield simply means the actual weight of polymer produced.

EXAMPLE I

Commercial grade solvents were distilled from an appropriate drying agent and stored under argon prior to use. Anhydrous chromocene was purchased from Strem Chemical Company. Unless specified otherwise, all manipulations were carried out under an inert atmosphere. The bis-arene chromium compounds $Cr(Tol)_2$ (ditoluene chromium) and $Cr(Mes)_2$ (dimesitylene chromium) were made according to literature methods. The compound $Cr(Cum)_2$ (dicumene chromium) was purchased from the Aldrich Chemical Company.

The aluminum phosphate used in the following experiments was made according to a procedure in which a melt of aluminum nitrate and monobasic ammonium phosphate were gradually neutralized with concentrated ammonia. After washing the resulting gel with water and then acetone, it was then dried at 70° C. in a vacuum oven. Activation at the appropriate temperature was carried out in a stream of dry oxygen for three hours. It was then allowed to cool in an argon stream and finally stored under an argon or nitrogen atmosphere. The P:Al atom ratio was 0.8.

All polymerization runs were carried out in a two liter bench reactor under slurry (particle form) conditions. The diluent was isobutane and the reactor temperature was 96° C. unless specified otherwise. Reactor pressure held at 550 psig during the polymerization with ethylene being fed on demand.

The actual charging of the reactor was accomplished by either of the following methods.

Method A: Separate streams of support and chromium solution.

After purging the reactor at 100° C. with a stream of nitrogen for at least 15 minutes, the system was flushed several times with isobutane. A preweighed amount of support was charged against a slight countercurrent of gaseous isobutane. Approximately 500 mL of liquid isobutane was then added to the reactor. The appropriate amount of the organochromium solution was added to the inject port and flushed into the reactor with the remaining charge of isobutane. When desired, hydrogen was then added and finally the reactor pressurizee with ethylene.

Method B: Impregnation of support with organochromium solution.

A preweighed sample of support was slurried in a hydrocarbon such as pentane. The amount of organochromium solution was then added to give the desired Cr:support ratio, and the slurry shaken until complete discoloration of the supernatant was observed. Excess solvent was then decanted and the catalyst dried under vacuum at 50° C. Following the purging procedure outlined in Method A, a preweighed portion of the catalyst was charged to the reactor as a free flowing powder. The total charge of isobutane was then added, followed by the appropriate amount of hydrogen and finally ethylene.

The rheological data was obtained using a Rheometrics Dynamic Spectrometer (RDS). The polymer sample was first compression molded into slabs. A circular disk with ⅛" thickness and 1" diameter was then cut from the slab and mounted between the concentric oscillating disks of the spectrometer. While holding the temperature constant at 190° C., the instrument measures the in phase (storage modulus, G') and the out of phase (loss modulus, G'') components of the strain induced by the shear stress of the oscillating plates as a function of the oscillation frequency, $\omega$. The melt viscosity was also determined as a function of $\omega$.

The average activity for the invention catalysts under optimum conditions was approximately 7–8000 g/g AlPO$_4$/hr whereas the average for bis-arene chromium/AlPO$_4$ systems was around 2–3000 g/g AlPO$_4$/hr. Table 1 gives the specific polymerization data for a variety of runs for the invention and zerovalent systems. All of the runs in Tables I, II, III and IV were made according to Method A in which an amount of AlPO$_4$ support (0.02–22 g) was charged to the reactor followed by a given volume (1–3 mL) of the organochromium solution (~0.015M in n-pentane).

TABLE I
POLYMERIZATION DATA FOR THE (Cp)$_2$Cr/AlPO$_4$[a] AND Cr(Mes)$_2$/AlPO$_4$[b] CATALYSTS

| Run | Chromium Compound | Wt. % Cr[c] | Activity g/g AlPO$_4$ hr | Activity g/g Cr/hr | ppm Cr[d] |
|---|---|---|---|---|---|
| 1 | (Cp)$_2$Cr | 1.5 | 7000 | 457,000 | 2.2 |
| 2 | (Cp)$_2$Cr | 2.8 | 7200 | 258,000 | 3.9 |
| 3 | (Cp)$_2$Cr | 1.1 | 5100 | 463,000 | 2.2 |
| 4 | (Cp)$_2$Cr | 0.6 | 2700 | 450,000 | 2.2 |
| 5 | (Cp)$_2$Cr | 3.1 | 2200 | 73,000 | 13.6 |
| 6 | (Cp)$_2$Cr | 0.3 | 1300 | 458,000 | 2.2 |
| Control 1 | Cr(Mes)$_2$ | 3.0 | 1670 | 56,000 | 17.8 |
| Control 2 | Cr(Mes)$_2$ | 1.5 | 2580 | 169,000 | 5.9 |
| Control 3 | Cr(Mes)$_2$ | 1.3 | 2430 | 194,000 | 5.2 |
| Control 4 | Cr(Mes)$_2$ | 0.5 | 1780 | 374,000 | 2.7 |
| Control 5 | Cr(Mes)$_2$ | 0.7 | 2110 | 317,000 | 3.2 |
| Control 6 | Cr(Mes)$_2$ | 2.9 | 2580 | 89,000 | 11.2 |
| Control 7 | Cr(Mes)$_2$ | 7.1 | 390 | 6,000 | 166.7 |

[a]Bis-(cyclopentadienyl)chromium(II) on AlPO$_4$ support activated at 600° C.
[b]Dimesitylene chromium (i.e. zerovalent) on AlPO$_4$ support activated at 600° C.
[c]Weight percent of chromium charged to the reactor based on the weight of the aluminum phosphate charge. All runs on this table used Method A.
[d]Parts per million chromium in the polymer based on total Cr charge.
These data show higher productivities for the bis-(cyclopentadienyl)chromium(II) compound as compared with zerovalent chromium based on similar weights of chromium present.

TABLE II
POLYMERIZATION AND RHEOLOGICAL DATA

| Run | Support | Act. Temp. °C. | Chromium | H$_2$ (Psig) | HLMI | Shear Response | Activity (gm/gm/hr) | Melt Viscosity (M Poise) | Solution Viscosity Dl/g | Est. MW |
|---|---|---|---|---|---|---|---|---|---|---|
| 7 | AlPO$_4$ | 600 | (Cp)$_2$Cr | 0 | 0 | | 6,700 | — | 15.34 | 3,000,000 |
| 8 | AlPO$_4$ | 800 | (Cp)$_2$Cr | 0 | 0 | | 7,200 | 96.2 | 17.07 | 3,500,000 |
| 9 | AlPO$_4$ | 650 | (Cp)$_2$Cr | 0 | 0 | | 6,700 | 106.0 | Inso. | ≧4,000,000[a] |
| 10 | AlPO$_4$ | 600 | (Cp)$_2$Cr | 2 | .05 | | 3,000 | 14.2 | 6.57 | 1,000,000 |
| 11 | AlPO$_4$ | 600 | (Cp)$_2$Cr | 3 | .15 | | 3,000 | 10.5 | 5.40 | 800,000 |
| 12 | AlPO$_4$ | 600 | (Cp)$_2$Cr | 5 | 1.24 | | 11,200 | 1.0 | 3.43 | 407,000 |
| 13 | AlPO$_4$ | 600 | (Cp)$_2$Cr | 10 | 6.38 | | 4,600 | — | 3.29 | 385,000 |
| 14 | AlPO$_4$ | 600 | (Cp)$_2$Cr | 15 | 11.75 | | 4,400 | — | 2.20 | 220,000 |
| Control 8 | AlPO$_4$[b] | 600 | Cr(Tol)$_2$ | 0 | .28 | | 2,100 | — | Insol. | ≧4,000,000[a] |
| Control 9 | AlPO$_4$ | 600 | Cr(Mes)$_2$ | 0 | .36 | | 3,000 | — | Insol. | ≧4,000,000[a] |
| Control 10 | AlPO$_4$ | 600 | Cr(Mes)$_2$ | 1 | 72.95 | | 2,300 | — | 2.45 | 255,000 |
| Control 11 | Silica | 600 | (Cp)$_2$Cr | 0 | | | 1,042 | | | |
| Control 12 | Silica | 600 | (Cp)$_2$Cr | 0 | . | | 1,535 | | | |
| Control 13 | Silica | 600 | (Cp)$_2$Cr | 0 | | | 1,900 | | | |
| Control 14 | Silica | 600 | (Cp)$_2$Cr | 3 | 1.34 | 67 | 1,634 | | | |
| Control 15 | Silica | 600 | (Cp)$_2$Cr | 5 | 5.38 | 77 | 1,136 | | | |
| Control 16 | Silica | 600 | (Cp)$_2$Cr | 10 | 32.2 | 53 | 138 | | | |

[a]Polymers insoluble in trichlorobenzene (TCB) are assumed to have molecular weight ≧4,000,000.
[b]Ditoluene chromium.

These data show the ability to produce zero melt flow polymer using the invention catalyst. As can further be seen the molecular weight is considerably higher than for a commercial ultra high molecular weight polymer, Hostalen GUR (American Hoechst) having a molecular weight of about 2,500,000.

As can be seen from Control Runs 11–16, the productivities for chromocene with silica added separately are much lower (138 to 1,900) compared with 3,000 to 11,200 for chromocene on phosphate (invention). In addition, the shear is much higher (53-77) for inventive runs compared with 22-29 (Table III). Zerovalent chromium and silica added separately is inactive.

Blanks indicate no data are available or that none can be obtained.

TABLE III

MOLECULAR WEIGHT DISTRIBUTION DATA

| Run | Compound | H$_2$ Psig | MI | Shear Response | HI[a] |
|---|---|---|---|---|---|
| Control 11 | Cr(Mes)$_2$ | 1 | .05 | 1590 | 77.8 |
| Control 12 | Cr(Mes)$_2$ | 3 | .49 | 350 | —[b] |
| Control 13 | Cr(Mes)$_2$ | 5 | .70 | 521 | 41.8 |
| Control 14 | Cr(Mes)$_2$ | 10 | 4.50 | 196 | 30.0 |
| Control 15 | Cr(Tol)$_2$ | 1 | .02 | 413 | — |
| Control 16 | Cr(Tol)$_2$ | 3 | .36 | 257 | — |
| Control 17 | Cr(Tol)$_2$ | 5 | 1.18 | 196 | — |
| 15 | (Cp)$_2$Cr | 5 | .09 | 22 | 4.3 |
| 16 | (Cp)$_2$Cr | 10 | .22 | 29 | 6.3 |
| 17 | (Cp)$_2$Cr | 15 | .51 | 23 | 5.0 |
| 18 | (Cp)$_2$Cr | 20 | 5.57 | 22 | 3.3 |
| 19 | (Cp)$_2$Cr | 25 | 16.31 | 24 | 3.6 |

[a]Heterogeneity index, $M_w/M_n$, as determined from size exclusion chromatography.
[b]A dash signifies not determined.

These data show very narrow molecular weight polymer is produced with the invention catalyst. (Shear response of 22-29). Such narrow molecular weight distribution is unusual although not previously unknown. Ethylene polymer with a distribution below 25 may be unknown in prior art ethylene polymer. In any event, as is shown in Example VIII hereinafter, polymer made with the chromium(II) compounds on a phosphate-containing support exhibit a very high degree of methyl branching. Polymers of a molecular weight distribution no more than 29 and at least 0.4 mole percent methyl branching were heretofore unknown.

TABLE IV

RHEOLOGICAL DATA BY RDS ANALYSIS

| Run | Compound | Support | H$_2$ (Psig) | Viscosity[a] M Poise | Tan δ[a] |
|---|---|---|---|---|---|
| 20 | (Cp)$_2$Cr | F—AlPO$_4$[b] | 0 | 106.0 | 0.15 |
| 21 | (Cp)$_2$Cr | AlPO$_4$ | 0 | 96.2 | 0.13 |
| 22 | (Cp)$_2$Cr | AlPO$_4$ | 20 | 14.2 | 1.47 |
| 23 | (Cp)$_2$Cr | AlPO$_4$ | 30 | 10.5 | 0.73 |
| 24 | (Cp)$_2$Cr | AlPO$_4$ | 50 | 1.0 | 3.00 |
| Control 12 | Cr(Cum)$_2$[c] | AlPO$_4$ | 0 | 24.1 | 0.27 |
| Control 13 | | | | 39.1 | 0.30 |

[a]All values measured at 0.1 Radians/Sec., 190° C.
[b]Fluorided AlPO$_4$.
[c]Dicumene chromium.

These data show the ability of the invention catalyst to inherently produce a high viscosity polymer, but because of sensitivity to hydrogen, the same catalyst can produce a complete spectrum of polymers so far as viscosity or melt flow is concerned.

EXAMPLE II

In this example, AlPO$_4$ produced as in Example I and having a P:Al atom ratio of 0.8 was calcined at 700° C. It was impregnated (Method B) with bis-(cyclopentadienyl)chromium(II) and used with and without TEB with the following results.

| TEB | Time, Minutes | Productivity, g/g |
|---|---|---|
| 0 | 40 | 1440 |
| 8 ppm | 75 | 3440 |

As can be seen, the cocatalyst increased the productivity considerably. While the triethylborane (TEB) run was carried out for 75 minutes compared with 40 for the run with no TEB, as can be seen from FIG. 2, little additional polymer would be formed after 40 minutes and thus this is a valid comparison.

EXAMPLE III

In this example, several conventional aluminum phosphates were made as described in Hill et al, U.S. Pat. No. 4,219,444 (Aug. 26, 1980). One aluminum phosphate, having a 0.8 P/Al atom ratio, was prepared by dissolving 93.8 g (0.25 mole) of Al(NO$_3$)$_3$.9H$_2$O and 23 g (0.20 mole) of NH$_4$H$_2$PO$_4$ in 2.5 L of deionized water. To the stirred solution was added 40 mL of concentrated ammonium hydroxide solution (28%) to bring the pH of the mixture to about 6. The precipitate was filtered off, dried overnight in a vacuum oven at 80° C. and the dry product was activated by calcination for 3 hours at 600° C. as described in Example I.

Ethylene was polymerized in Run 1 as in Method A of Example I by charging the reactor was 0.1726 g of the activated aluminum phosphate and 2 mL of the bis-(cyclopentadienyl) chromium(II) solution employed in Runs 1-6 of Table I. The calculated amount of chromium employed, based on the aluminum phosphate charge, was 2.3 weight percent. In the absence of hydrogen, a reactor pressure of 550 psig and a reactor temperature of 91° C., 300 g of polyethylene was produced in one hour. The calculated activities were 1740 g polymer per g AlPO$_4$ per hour and 75,000 g polymer per g chromium per hour.

As can be seen, in comparing the control catalyst used in Run 1 with invention catalysts of Runs 1, 2, 3 of Example I, which bracket the amount of chromium employed in this Example, the control catalyst is much less active. The invention catalysts show activities based on AlPO$_4$ charged ranging from 5100 to 7200 g polymer per g AlPO$_4$ per hour whereas on the same basis the control catalyst shows 1740 g polymer per g AlPO$_4$ per hour.

It should be noted that the control catalyst was used at a reactor temperature of 91° C. while the invention catalysts were used at a reactor temperature of 96° C. in the polymerization runs. In slurry polymerization, at the same total reactor pressure that was used, the effective ethylene pressure increases with decreasing reactor temperature. Consequently, if the control catalyst was used at 96° C., the productivity figures noted above at 91° C. would be somewhat lower.

EXAMPLE IV

This example shows the difference in microstructure as determined from infrared spectra between polymer made using the invention catalyst and a zerovalent catalyst.

| | | Groups/1000 Carbon Atoms | | |
|---|---|---|---|---|
| Run | Chromium | MI | Vinyl | Methyl | Additive |
| 1 | (Cp)$_2$Cr | 0 HLMI | 0.1 | 2.5 | None |
| 2 | (Cp)$_2$Cr | 0 HLMI | 0.1 | 1.7 | TEB |
| 3 | (Cp)$_2$Cr | 3000 | 0 | 10.8 | H$_2$ |
| 4 | Cr(Cum)$_2$ | 15 HLMI | 5.2 | 6.0 | None |
| 5 | Cr(Cum)$_2$ | 163 | 7.8 | 9.0 | H$_2$ |
| 6 | Cr(Cum)$_2$ | 0.14 | 4.8 | 6.1 | TEB |

EXAMPLE V

This example shows the effect of combining a bis-(cyclopentadienyl)chromium(II) compound with an aluminum phosphate base already having hexavalent chromium on it. Cr/AlPO$_4$ (P/Al=0.8) produced by cogelling aluminum phosphate and chromium nitrate to give 1½ weight percent chromium based on the weight of AlPO$_4$ was calcined at 600° C. and was charged to the reactor (between 0.04–0.1 gm) along with 1 mL of chromocene solution and 12 ppm of TEB. Run at 102° C., 550 psig ethylene. (No H$_2$ used.) The results were as follows:

| Run | Chromocene | Prod., g/g | MI | HLMI | HLMI/MI | Den.$^{(a)}$ | Flex.$^{(b)}$ | ESCR$^{(c)}$ |
|---|---|---|---|---|---|---|---|---|
| 1 | 0.011 g Cr/mL | 944/41 min. | 0 | 0 | — | 0.9275 | 628 | ≧1000 |
| 2 | 0.011 g Cr/mL | 2686/hr | 0 | .09 | — | 0.9527 | 1360 | ≧1000 |
| 3 | 0.0011 g Cr/mL | 2400/hr | .08 | 26 | 325 | 0.9679 | 1693 | 100 |

$^{(a)}$density, g/cm$^3$; ASTM D 1505-68.
$^{(b)}$flexural modulus, MPa; ASTM D 790-66.
$^{(c)}$environmental stress cracking resistance, F$_{50}$ hours; ASTM D 1693-70.

1. These runs compared with Runs 7 and 8 of Table II where chromocene was used without TEB show that:

In the absence of TEB or H$_2$, MI=HLMI=0 was always obtained. Whereas in above runs when TEB/Cr ratio is high, a measurable MI or HLMI resulted.

2. These runs compared with Runs 16–19 of Table III show that the MWD is narrow in Runs 16–19 whereas TEB and the two types of chromium give broad MWD.

3. The density is higher in Runs 1 and 2 above giving excellent stiffness.

4. The ESCR/Flex. combination is very good in the above runs.

EXAMPLE VI

This example shows that with other chromium catalysts which are effective when added to a phosphate base and calcined, are not effective when added as a separate stream to the reactor. T-butyl chromate was added to a reactor as a separate stream with AlPO$_4$. The aluminum phosphate had a P/Al ratio of 0.8 and was calcined at 700° C. The polymerization was carried out at 96° C. with 550 psig ethylene. Separate streams, one comprising 0.2477 gm AlPO$_4$ and the other ¼ mL t-butyl chromate solution in hexane were added (0.01 gm Cr/mL) (i.e. 1% Cr calculated). Eight ppm TEB was used. The run was dead.

EXAMPLE VII

The following example is presented to show miscellaneous combinations possible utilizing the catalyst system of this invention and contrast the various systems with divalent π-bonded chromium on silica. The aluminum phosphate was prepared as in Example I and the polymerization was carried out as in Example I. The results were as follows:

TABLE VI

| Run | Base | Act.$^{(1)}$ Temp. °C. | Cr(Cp)$_2$,$^{(4)}$ mL | Add. | Prod., g/g | Time | MI | HLMI | | Flex. | Den. | ESCR | HI$^{(5)}$ |
|---|---|---|---|---|---|---|---|---|---|---|---|---|---|
| 1 | AlPO$_4$ | 600 | ½ | None | 1,700 | 50 | 0 | HL | — | 585 | 0.9220 | | |
| 2 | AlPO$_4$ | 600 | ½ | 4 ppm TEB | 3,083 | 40 | 0 | HL | — | | | | |
| 3 | AlPO$_4$/Cr$^{+6}$ | 250$^{(2)}$ | 1 | 4 ppm TEB | 1,300 | 30 | 0 | HL | — | 575 | 0.9262 | | |
| 4 | AlPO$_4$/Cr$^{+6}$ | 250$^{(2)}$ | ½ | 4 ppm TEB | 3,800 | 60 | 1.5 | HL | | | | | |
| 5 | AlPO$_4$/Cr$^{+6}$ | 600 | 9/1$^{(3)}$ | 4 ppm TEB | 2,600 | 60 | .03 | | 155 | | | | |
| 6 | AlPO$_4$/1% F | 600 | ½ | None | 6,700 | 60 | 0 | HL | | | | | |
| 7 | AlPO$_4$/1% F | 600 | ½ | 4 ppm TEB | 1,000 | 30 | | | | | | | |
| 8 | AlPO$_4$ | 600 | 3 | 10 H$_2$ (psig) | 4,600 | 60 | .22 | | 29 | 1,181 | 0.9481 | 38 | 6.3 |
| 9 | AlPO$_4$ | 600 | 3 | 5 H$_2$ (psig) | 3,850 | 60 | .09 | | 22 | 957 | 0.9450 | 110 | 4.3 |
| 10 | AlPO$_4$ | 600 | 3 | 15 H$_2$ (psig) | 4,362 | 60 | .51 | | 23 | 1,228 | 0.9513 | ≧24 | 5.0 |
| 11 | H$_3$PO$_4$/Al$_2$O$_3$ | 600 | 2 | — | 8,400 | 60 | 0 | HL | — | 579 | 0.9259 | | |
| 12 | H$_3$PO$_4$/Al$_2$O$_3$ | 600 | 2 | 10 H$_2$ (psig) | 5,100 | 60 | .18 | | 31 | 1,212 | 0.9508 | | |
| 13 | H$_3$PO$_4$/Al$_2$O$_3$ | 600 | 2 | 50 H$_2$ (psig) | 3,800 | 45 | 11.2 | | 31 | 1,670 | 0.9667 | | |
| 14 | H$_3$PO$_4$/Al$_2$O$_3$ | 600 | 2 | 25 H$_2$ (psig) | | | .78 | | 59 | 1,322 | 0.9566 | | |
| 15 | SiO$_2$ | 600 | 5 | — | 1,900 | 60 | 0 | HL | — | 845 | 0.9350 | | |
| 16 | SiO$_2$ | 600 | 1 | 2 H$_2$ (psig) | 6,750 | 60 | .04 | HL | — | 815 | 0.9336 | | |
| 17 | SiO$_2$ | 600 | 1 | 3 H$_2$ (psig) | 3,990 | 60 | .31 | HL | — | 875 | 0.9382 | | |
| 18 | SiO$_2$ | 600 | 2 | 3 H$_2$ (psig) | 1,634 | 60 | .02 | | 67 | 1,080 | 0.9464 | | |
| 19 | SiO$_2$ | 600 | 3 | 5 H$_2$ (psig) | 1,136 | 60 | .07 | | 77 | 1,151 | 0.9488 | | |
| 20 | SiO$_2$ | 600 | 3 | 10 H$_2$ (psig) | 138 | 60 | .61 | | 52 | | | | |
| 21 | SiO$_2$ | 600 | 3 | 15 H$_2$ (psig) | 123 | 60 | 2.93 | | 39 | | | | |

$^{(1)}$In air unless otherwise specified.
$^{(2)}$AlPO$_4$ alone calcined at 600° C. then Cr$^{+6}$ added and activated at 250° C. in CO to give about Cr$^{+2}$.
$^{(3)}$Cr containing base calcined at 600° C. then added as separate streams with bis-(cyclopentadienyl)chromium(II) at a 9/1 mole ratio of CR from the base and chromium from the bis-(cyclopentadienyl)chromium(II).
$^{(4)}$0.002 g/mL.
$^{(5)}$Heterogeneity index, M$_w$/M$_n$, as determined by size exclusion chromatography.
$^{(6)}$Blanks indicate no data are obtained or not available.

Run 1 shows a run in accordance with the invention. As can be seen with no special treatments, the catalyst system of the invention is operable to produce polymer at a moderately good productivity. Run 2 shows the impregnated (Method B) with bis-(cyclopentadienly)-chromium(II) designated chromocene or dicumene chromium, designated DCC and used without TEB with the following results.

TABLE VII

|  | Run 1 | Run 2 | Run 3 | Run 4 | Control 1 |
|---|---|---|---|---|---|
| Processing Variables | | | | | |
| Reactor Temp. (°C.) | 195 | 195 | 195 | 195 | 195 |
| Monomer Feed (mole %) | | | | | |
| $C_2=$ | 98.6 | 98.8 | 96.2 | 96.3 | 100 |
| $C_3=$ | — | — | — | — | — |
| $C_4=$ | — | 1.2 | 3.8 | 3.7 | — |
| $C_6=$ | 1.4 | — | — | — | — |
| Others | — | — | — | — | — |
| Catalyst | | | | | |
| Aluminum Phosphate | Yes | Yes | Yes | Yes | Yes |
| Cr added via | Chromocene | Chromocene | Chromocene | Chromocene | DCC |
| Polymer Characteristics | | | | | |
| Density | 0.9218 | 0.9202 | 0.9201 | 0.9195 | 0.9383 |
| MI (HLMI) | * | * | * | * | * |
| MW | UHMW | UHMW | UHMW | UHMW | UHMW |
| MWD (By GPC, | ** | ** | ** | ** | ** |
| I.V. ($[\eta]$) | 16.08 | 16.13 | 16.06 | 13.70 | *** |
| C-13 NMR Results | | | | | |
| Apparent Monomer Incorporated | | | | | |
| $C_2=$ (mole %) | 99.35 | 99.34 | 99.22 | 99.13 | 99.66 |
| $C_3=$ (mole %)[(1)] | 0.44 | 0.47 | 0.49 | 0.47 | 0.10 |
| $C_4=$ (mole %)[(2)] | 0.07 | 0.11 | 0.21 | 0.23 | 0.11 |
| $C_6=$ (mole %)[(3)] | 0.14 | 0.01 | ~0.08 | 0.05 | ~0.13 |
| Others (mole %) | — | ~0.02 | ~0.11 | | |
| Total Branches (mole %) | 0.65 | 0.66 | 0.78 | 0.87 | 0.34 |

* HLMI not measurable.
** Samples cannot be run on GPC because of low solubility or solution being too viscous.
*** Sample insoluble.
[(1)] i.e., methyl branches. The results look like propylene comonomer was present in the feed even though none was.
[(2)] i.e., ethyl branches.
[(3)] i.e., butyl branches advantage and productivity from the inclusion of a cocatalyst such as the alkyl boron compound. While there is some scatter in the data because under the experimental conditions utilized, the chromocene sometimes became contaminated, the data when viewed as a whole shows an advantage for use of the cocatalyst. Runs 3 and 4 show that the chromocene can be used with a base which already contains chromium in a +2 state (obtained by reducing chromium +6). Although Run 3 did not give particularly good productivity, it was carried out for only 30 minutes. Run 5 shows good melt index obtained by using an aluminum phophate base containing hexavalent chromium in combination with chromocene. Runs 6 and 7 show that the base can be fluorided. Run 7 is not believed to be a true representation of the effective TEB. This run was carried out for only 30 minutes and in all likelihood the run was either just beginning to polymerize actively when it was terminated or the chromocene was contaminated in some way. Runs 8-10 show a production of polymer in accordance with the invention having usable melt index values, and relatively high productivities. A comparison of Run 10 and Run 21 shows the greatly improved productivity using the bis-(cyclopentadienyl)chromium(II) with aluminum phosphate as opposed to silica. Also, a different moleclar weight distribution was obtained as is evident by comparing the HLMI/MI ratios. Run 11 shows outstanding productivity. Runs 12 and 13 show a good combination of high productivity, usable melt index, and high density.

EXAMPLE VIII

In this example, AlPO$_4$ produced as in Example I and having a P:Al ratio of 0.9 was calcined at 600° C. It was As can be seen, an unusual polymer results having ultrahigh molecular weight and a high proportion of methyl branches in the absence of propylene comonomer. Thus polymer having at least 0.4 mole percent methyl branches and ultrahigh molecular weight is possible. This data, taken with the data in Table II show that polymer is provided having a molecular weight of at least 3 million and at least 0.4 mole percent methyl branches. Of course, polymer with methyl branches is easily formed using ethylene and propylene comonomer, but not at this high molecular weight. By mole percent is meant the number of methyl groups based on pairs of carbon atoms in the backbone. That is, a 200 carbon atom chain with 1 methyl branch would be 1 mole percent.

Thus, it is a further object of this invention to provide a polymer having about 0.3 to about 2, preferably from about 0.4 to 1, more preferably from 0.4 o 0.6 mole percent methyl branches from a monomer feed which is essentially free of propylene. Thus, either a pure ethylene feed could be utilized to give essentially a homopolymer or ethylene with butene or higher comonomers can be utilized to give a polymer having methyl branches of the type normally associated with propylene comonomer but in the absence of any propylene comonomer. This is novel in itself but is particularly remarkable in view of the ability to produce such polymers with high molecular weight, for instance, at least 3,000,000 and/or a narrow molecular weight distribution of no more than 29 HLMI/MI ratio.

EXAMPLE IX

In this example, chromocene on phosphate is compared with chromocene on silica.

TABLE VIII

| Run | Catalyst | Monomer Feed | Molecular Structures Observed and Approx. Quantity |
|---|---|---|---|
| 1 | Aluminum phosphate | $C_2^=$ | Isolated methyl branches (0.60 mole % $C_3^=$) |
| 2 | Aluminum phosphate | $C_2^=$ | Isolated methyl branches (0.50 mole % $C_3^=$) |
| 3 | Aluminum phosphate | $C_2^=$ | Isolated methyl branches (0.41 mole % $C_3^=$) |
| 4 | Aluminum phosphate | $C_2^=$ | Isolated methyl branches (0.32 mole % $C_3^=$) |
| 5 | Aluminum phosphate | $C_2^=$ | Isolated methyl branches (0.51 mole % $C_3^=$) |
| 6 | Aluminum phosphate | $C_2^=$, $C_6^=$ | Isolated methyl branches (0.46 mole % $C_3^=$) |
| 7 | Aluminum phosphate | $C_2^=$, $C_6^=$ | Isolated methyl branches (0.37 mole % $C_3^=$) |
| 8 | Phosphated Alumina | $C_2^=$ | Isolated methyl branches (0.38 mole % $C_3^=$) |
| Control 1 | Silica Cogel | $C_2^=$ | Long chain branches (2 per 5 molecules), i.e., less than 0.1 mole percent |
| Control 2 | Silica Cogel | $C_2^=$ | No branches |

As can be seen in Runs 1-3 even with no comonomer, methyl branches are obtained. Control Run 1 of Table VII and Control Runs 1 and 2 herein, show that zerovalent chromium on aluminum phosphate does not give the large amounts of methyl branches nor does chromocene on silica. Thus, the effect of the chromium(II) on a phosphate base is unexpectedly different than that obtained with similar systems.

While this invention has been described in detail for the purpose of illustration, it is not to be construed as limited thereby but is intended to cover all changes and modifications within the spirit and scope thereof.

What is claimed is:

1. An ethylene polymer having 0.3 to 2 mole percent methyl branches and an HLMI/MI ratio of no more than 29 made by polymerizing a monomer system consisting essentially of pure ethyelene which is essentially free of propylene.

2. A composition according to claim 1 made using a catalyst system comprising a bis-(cyclopentadienyl)-chromium(II) compound and a phosphate containing support.

3. A composition according to claim 2 wherein said catalyst is used in conjunction with an organometal cocatalyst.

4. A composition according to claim 1 wherein said polymer has 0.4 to 1 mole percent methyl branches.

5. A composition according to claim 1 wherein said polymer has 0.4 to 0.6 mole percent methyl branches.

6. An ethylene polymer having 0.3 to 2 mole percent methyl branches and a weight average molecular weight of at least 3,000,000 made by contacting a monomer system essentially free of propylene with a catalyst system comprising a bis-(cyclopentadienyl) chromium-(II) compound and a phosphate containing support.

7. An ethylene polymer according to claim 6 wherein said catalyst is further characterized by being used in conjunction with an organometal cocatalyst.

8. A composition according to claim 7 wherein said polymer has an HLMI/MI ratio of no more than 29.

9. A composition according to claim 7 wherein said polymer has from 0.4 to 1 mole percent methyl branches.

10. A composition according to claim 7 wherein said polymer has within the range of 0.4 o 0.6 mole percent methyl branches.

11. A composition in accordance with claim 7 wherein said monomer system consists essentially of pure ethylene.

12. An ethylene polymer having a weight average molecular weight of at least 3,000,000 and 0.3 to 2 mole percent methyl branches.

13. A polymer in accordance with claim 12 produced from a monomer system essentially free of propylene.

14. A polymer according to claim 13 wherein said monomer system consists essentially of ethylene.

* * * * *